(12) United States Patent
Böhm et al.

(10) Patent No.: US 12,738,510 B2
(45) Date of Patent: Sep. 15, 2026

(54) METHOD FOR PRODUCING A BIPOLAR PLATE STRAND, METHOD FOR PRODUCING A BIPOLAR PLATE, AND DEVICE FOR IMPLEMENTING THE METHOD

(71) Applicant: AUDI AG, Ingolstadt (DE)

(72) Inventors: Daniel Böhm, Neuenstadt (DE); Markus Gretzer, Eichstätt (DE); Eva Heuberger, Ingolstadt (DE); Jan-Philipp Weberpals, Abstatt (DE)

(73) Assignee: AUDI AG, Ingolstadt (DE)

( * ) Notice: Subject to any disclaimer, the term of this patent is extended or adjusted under 35 U.S.C. 154(b) by 875 days.

(21) Appl. No.: 18/005,038

(22) PCT Filed: Aug. 18, 2021

(86) PCT No.: PCT/EP2021/072872

§ 371 (c)(1),
(2) Date: Jan. 10, 2023

(87) PCT Pub. No.: WO2022/043142

PCT Pub. Date: Mar. 3, 2022

(65) Prior Publication Data

US 2024/0039015 A1 Feb. 1, 2024

(30) Foreign Application Priority Data

Aug. 24, 2020 (DE) ..................... 10 2020 122 079.0

(51) Int. Cl.

*H01M 8/0297* (2016.01)
*B23K 26/24* (2014.01)
*B23K 26/70* (2014.01)

(52) U.S. Cl.

CPC .......... *H01M 8/0297* (2013.01); *B23K 26/24* (2013.01); *B23K 26/70* (2015.10)

(58) Field of Classification Search

CPC .. H01M 8/0297; H01M 8/0206; H01M 8/026; H01M 8/0254; B23K 26/24; B23K 26/70; Y02E 60/50

See application file for complete search history.

(56) References Cited

U.S. PATENT DOCUMENTS

2004/0072053 A1 4/2004 Schlag
2005/0133568 A1 6/2005 Sigler et al.

(Continued)

FOREIGN PATENT DOCUMENTS

DE 10221951 A1 12/2003
DE 102010054617 A1 6/2012

(Continued)

OTHER PUBLICATIONS

International Search Report, mailed Dec. 13, 2021, for International Patent Application No. PCT/EP2021/072872. (2 pages).

(Continued)

*Primary Examiner* — Ula C Ruddock
*Assistant Examiner* — Sarika Gupta
(74) *Attorney, Agent, or Firm* — Seed Intellectual Property Law Group LLP

(57) ABSTRACT

A method for producing a bipolar plate strand comprises: providing of the unipolar plate strands; moving of the unipolar plate strands in the direction of a roll gap of a roll pair provided with roll structures of a rolling device; sending of a laser beam of a laser device onto a rotating mirrored polygon wheel, so that the laser beam is directed at a plurality of individual positions of a surface of one or both of the unipolar plate strands and the individual positions are thus heated to a joining temperature immediately before or upon entry of the unipolar plate strands in the roll gap; and joining of the unipolar plate strands at least at one of the individual positions of the surface to form a bipolar plate (Continued)

strand upon transporting of the unipolar plate strands through the roll gap under the action of pressure. A method for production of a bipolar plate as well as a device to implement the method are also provided.

10 Claims, 4 Drawing Sheets

(56) References Cited

U.S. PATENT DOCUMENTS

| | | | | |
|---|---|---|---|---|
| 2005/0252892 | A1 | 11/2005 | Newman et al. | |
| 2006/0027634 | A1 * | 2/2006 | Sigler ................ | H01M 8/0206 228/235.2 |

FOREIGN PATENT DOCUMENTS

| | | | |
|---|---|---|---|
| DE | 102016125502 | A1 | 6/2018 |
| DE | 102018219056 | A1 | 5/2020 |
| EP | 2090395 | A2 | 8/2009 |
| EP | 3884536 | A1 | 9/2021 |
| JP | 2009193868 | A | 8/2009 |
| JP | 2013152941 | A | 8/2013 |
| WO | WO 2007135509 | A1 | 11/2007 |

OTHER PUBLICATIONS

Written Opinion of the International Searching Authority, mailed Dec. 13, 2021, for International Patent Application No. PCT/EP2021/072872. (6 pages)

* cited by examiner

METHOD FOR PRODUCING A BIPOLAR PLATE STRAND, METHOD FOR PRODUCING A BIPOLAR PLATE, AND DEVICE FOR IMPLEMENTING THE METHOD

BACKGROUND

Technical Field

Embodiments of the invention relate to a method for producing a bipolar plate strand, comprising a plurality of interconnected bipolar plates of a fuel cell. Embodiments of the invention also relate to a method for production of a bipolar plate of a fuel cell as well as a device to implement the two methods.

Description of the Related Art

Bipolar plates are used in fuel cells and fuel cell stacks. With the aid of the bipolar plates, fuel on the one hand is taken and distributed to an adjacent anode of a first fuel cell and the cathode gas is taken and distributed to a cathode of an adjacent second fuel cell, the bipolar plate furthermore having lines to carry a coolant. A bipolar plate is usually made from two unipolar plates formed as half shells, which are glued together in the case of bipolar plates formed from graphite. Metallic bipolar plates typically comprise two unipolar plates welded together at least for a portion.

EP 2 090 395 A2 describes a device for the production of metallic material composites and composite intermediates by hot roll cladding. A brief heating of at least one metal strip is done with the aid of electromagnetic induction and laser irradiation before at least two strips enter a roll gap. On account of the extreme metallurgical incompatibility of the base material of the metal strip, an interlayer material is inserted between the base material and an overlay material. A device for continuous production of bipolar plates making use of a laser welding apparatus is shown in DE 10 2018 219 056 A1.

JP 2009 193 868 A and JP 2013 152 941 A describe a roll welding method in which two unipolar plate strands are joined at a seam near the edge. DE 10 2016 125502 A1 describes a device for the production of bipolar plates for fuel cells making use of a seam welder.

DE 10 2016 125 502 A1 describes a device for the production of bipolar plates for fuel cells, where the substrate plates are first transported to a shaping mechanism and then to a joining mechanism. The shaping mechanism uses an embossing tool in this process to emboss ducts in the substrate plates.

In DE 10 2010 054 617 A1 there is described a method for producing bipolar plates in which at first a shaping and then a joining of pole plates occurs to form a bipolar plate. Within the production line, a cleaning process is carried out in order to clean the pole plates by means of a liquid medium. This document also points to the possibility of performing the joining of metallic pole plates by means of a welding process or soldering process, while other joining methods such as gluing or mechanical joining methods should likewise be possible.

In US 2005/0 252 892 A1 there is described a welding method for the welding of two unipolar plates to form a bipolar plate. US 2004/0 072 053 A1 also describes a method and a device for the welding of two unipolar plates to form a bipolar plate or a welding of the two unipolar plates with a spacer plate. Finally, WO 2007/135 509 A1 also points to the possibility of welding two unipolar plates to form a bipolar plate by means of a laser beam.

BRIEF SUMMARY

Some of the methods and devices described in the publications mentioned above direct the laser beam for welding onto the unipolar plates basically perpendicular to the plane in which the unipolar plates are situated. This creates welded seams, while continuous seams performing a sealing function may be formed. But it is also possible to form so-called step seams which provide a mechanical stabilization of the bipolar plate and an improved electrical contacting of the unipolar plates.

It has been discovered that there is a risk of pore formation in such laser-welded bipolar plates, which may result in local leakage in regard to a flow of media. Such leakage occurs statistically in particular at welded seams of especially far-reaching extent. Furthermore, it is known that leakage occurs more frequently at the beginning and end points of a seam. That is, the risk of leakage increases with the number of welded seams used and with their length. Furthermore, it has been found to be costly and difficult for laser welding to clamp the two unipolar plates in a clamping device such that the laser beam impinges in focused manner on the desired site being welded. Therefore, many makers of bipolar plates have resorted to providing additional embossing at ducts and/or webs of the unipolar plates in order to make room for the clamping means of the clamping device, which have an adequate width for the welded seam being made. The additional embossing furthermore creates reserves in regard to manufacturing tolerances needing to be canceled out in the positioning of the structural parts.

Some embodiments provide a method for the production of a bipolar plate strand, a method for the production of a bipolar plate, as well as a device to implement the method, alleviating or entirely eliminating at least some of the aforementioned shortcomings.

In some embodiments, a method for producing a bipolar plate strand, comprising a plurality of interconnected bipolar plates of a fuel cell, comprises:

- providing of a first unipolar plate strand and a second unipolar plate strand, the unipolar plate strands comprising a plurality of at least preformed webs and a plurality of at least preformed ducts running between every two adjacent webs,
- moving of the unipolar plate strands in the direction of a roll gap of a roll pair provided with roll structures of a rolling device,
- sending of a laser beam of a laser device onto a rotating mirrored polygon wheel, the laser beam being directed at a plurality of individual positions of a surface of one or both of the unipolar plate strands and the individual positions are thus heated to a joining temperature immediately before or upon entry of the unipolar plate strands in the roll gap, and
- joining of the unipolar plate strands at least at one of the individual positions of the surface to form a bipolar plate strand upon transporting of the unipolar plate strands through the roll gap under the action of pressure.

The joining process here is done in particular at spots, but line-oriented, thanks to the use of a new laser technology using the polygon wheel. The joint geometries to be realized here are created by bringing together point-like molten spots arising due to the transport of the unipolar plate strands (or individual unipolar plates) and the laser beam deflected by the polygon wheel.

This method is especially suitable for line-oriented, flat applications, because the process time can be enormously reduced in this way. Furthermore, an overall smaller heat input in the raw material can be achieved by the use of the rotating polygon wheel. Moreover, thanks to the savings achieved by omitting the clamping equipment, the duct and web geometries of the die bipolar plates can be further streamlined and optimized.

It is possible to use a beam dividing device, with which a plurality of polygon wheels can also be irradiated with the divided laser beam. Thus, it is possible to heat not only individual positions on the very same unipolar plate strand, but also a plurality of unipolar plate strands in different production lines.

There can be layouts in which the heating by means of the laser device is not adequate to heat the material of the two unipolar plate strands to its joining temperature either because of the dividing of the laser beam or due to the only brief bombardment with the laser alone. It has therefore proven to be advisable for at least one, or both, of the unipolar plate strands to be preheated before moving to the roll gap. An induction heating device or also an infrared radiator may be present for this.

If the two plates being joined for the unipolar plate strands are not yet preformed, and therefore are present as flat material, it may be advantageous for the webs and the ducts to be embossed by means of at least one embossing device before the unipolar plate strands are provided. Furthermore, it is possible for the webs and the ducts of the unipolar plate strands to be already pressed into their final shape; i.e., to be supplied to the roll pair not in a preformed, but in a finished formed state.

However, if only preformed webs and ducts are formed on the bipolar plate strands by means of the embossing device, it may be advantageous for the preformed webs and the preformed ducts to be pressed into their final shape during the transport through the roll gap under the action of pressure by means of the roll structures.

Depending on the choice of material or material combinations of the unipolar plates or the unipolar plate strands, it has proven to be advisable for the bipolar plate strand to be relaxed by means of a heating device, especially to be reheated or annealed. This increases the binding strength of the two unipolar plates to form the bipolar plate.

In order to provide the required sealing against the reaction media and or a reliable sealing against the leakage of coolant in a fuel cell stack, it may be advantageous for at least one seal to be applied to at least one, or to both, of the outer surfaces of the bipolar plate strand by means of an applicator device. For this, the applicator device can be a pressing device, for example, which presses a sealing material onto the outer surfaces of the bipolar plate strand in silkscreen printing. After applying the sealing material, it can be cured at a given temperature, for which the applicator device can additionally have a suitable heating device.

Depending on the chosen material concept of the overall fuel cell, an additional coating of the bipolar plate is often desired. In this regard, therefore, it has proven to be advisable for at least one coating to be applied to at least one of the outer surfaces of the bipolar plate strand by means of a coating device. Also for this a pressing device can be used, which for example applies the desired coating material to the outer surfaces by means of roller pressure. The pressing device may likewise comprise a suitable heating device, in order to dry the coating material once applied. The coating can be done, for example, after applying a seal. However, it is also possible to first apply the coating and only afterwards to provide the outer surfaces with at least one seal.

In order to produce a bipolar plate cut to a final dimension for use in a fuel cell stack, it is possible to divide up the bipolar plate strand by means of a cutting device into individual bipolar plates. The cutting of the still interconnected bipolar plates into stackable units at the end of the production process has the advantage that in this way the position tolerances of the individual process steps can be significantly reduced.

A homogeneous intensity of the laser beam can be achieved in that a drive unit is present for driving the polygon wheel in rotation, which is adapted to drive the polygon wheel in rotation with at least 1000 revolutions per minute or up to 12000 revolutions per minute. In this regard, and in order to prevent fluctuations in intensity, the drive unit may be adapted to hold constant the number of revolutions of the polygon wheel.

The irradiation of at least one polygon wheel (such as a high-speed galvanoscanner) is done with a laser device, especially one configured as a cw-laser. Here, "cw" stands for continuous wave and it means a "wave emitted constant over time." It is possible for the laser device to be a pulsed laser. Multiple laser devices may also be present.

The benefits and embodiment variants described for the method of production of a bipolar plate strand also hold for the method for production of a bipolar plate of a fuel cell described herein, since the device used for this is also suitable and designed to join, and therefore weld, unipolar plates already cut to final dimension in order to form a bipolar plate, in place of strand materials.

In some embodiments, a method for producing a bipolar plate comprises:

- providing of a first unipolar plate and a second unipolar plate, the unipolar plates comprising a plurality of at least preformed webs and a plurality of at least preformed ducts running between every two adjacent webs,
- moving of the unipolar plates in the direction of a roll gap of a roll pair provided with roll structures of a rolling device,
- local heating of at least one surface region of a surface of one or both of the unipolar plates, the surface region being heated to a joining temperature immediately before or upon entry of the unipolar plates in the roll gap,
- joining of the unipolar plates at the at least one surface region to form a bipolar plate upon transporting of the unipolar plates through the roll gap under the action of pressure,
- sending of a laser beam of a laser device onto a rotating mirrored polygon wheel, the laser beam being directed at a plurality of individual positions of a surface of one or both of the unipolar plates and the individual positions are thus heated to a joining temperature immediately before or upon entry of the unipolar plates in the roll gap, and
- joining of the unipolar plates at least at one of the individual positions of the surface to form a bipolar plate upon transporting of the unipolar plates through the roll gap under the action of pressure.

This method for the joining of two unipolar plates to form a bipolar plate also eliminates the shortcomings known in the prior art.

The device to implement the aforementioned method comprises a laser device, which is designed to heat by means of at least one laser beam at least one surface region of a surface of one or both of the two unipolar plate strands or one or both of the unipolar plates to a joining temperature. Moreover, there is present a rolling device having a roll pair forming a roll gap between them, wherein the rolls of the roll pair (106) are provided with a roll structure, which is designed to press a plurality of surface regions of the two unipolar plates or the two unipolar plate strands heated to the joining temperature during their transport through the roll gap such that the two unipolar plate strands are joined to form a bipolar plate strand, or the two unipolar plates are joined to form a bipolar plate at the surface regions. The laser device is associated with at least one mirrored polygon wheel driven in rotation, such that the laser beam is directed at a plurality of individual positions of the surface of one or both of the unipolar plate strands or unipolar plates and the individual positions are thus heated to the joining temperature immediately before or during the entry of the unipolar plate strands or the unipolar plates in the roll gap.

The feeding (transport) of the raw material and the point-like and/or line-shaped melting of this material brought about by the polygon wheel result in especially tight joint seams (weld seams), which is required especially in the case of bipolar plates needing an operationally secure separation of the operating media of a fuel cell stack. This device is especially suitable for line-oriented, flat applications, because the process time can be enormously reduced in this way. Furthermore, an overall smaller heat input in the raw material can be achieved by the use of the rotating polygon wheel. Moreover, thanks to the savings achieved by omitting the clamping equipment, the duct and web geometries of the die bipolar plates can be further streamlined and optimized.

For example, the surface regions in the roll gap form a plurality of contact lines composed of successive webs of two unipolar plates or two unipolar plate strands when they are pressed through the roll gap during transport under the action of pressure.

In other words, the laser device is formed such that the material of the unipolar plates can be heated to a joining temperature at their regions being joined, hence locally at the surface of the unipolar plates, especially locally at the webs of the unipolar plate strands or unipolar plates. The rolling device which comes after this is formed such that the necessary joining force to join together the two unipolar plates or unipolar plate strands in permanent manner to form a bipolar plate or to form a bipolar plate strand is applied during the transporting of the two unipolar plates or the two unipolar plate strands through the roll gap.

The laser device may be associated with a control unit, which is designed to activate the optics and also a drive mechanism of the polygon wheel of the laser device. The polygon wheel can be moved so fast that a plurality of surface regions can be heated by means of the laser beam in order to form a plurality of joined lines of contact or points of contact between the two unipolar plates or between the two unipolar plate strands during the transport through the roll gap.

Thanks to the use of such a device, the risks of leaks in the later bipolar plate are essentially dramatically reduced, so that the anticipated production rejects are also significantly decreased. The laser device, especially its optics, enables good control (and also regulation when necessary) of the heat source in time and space and thus a robust process management and a high weld quality.

One modification of the device calls for at least one of the unipolar plates or at least one of the unipolar plate strands to be straightened, and therefore smoothed out, by means of a straightening device, before webs or ducts are introduced into it. For this, the device has one or two straightening devices.

Furthermore, it is possible to have an embossing device present, in order to at least preform, especially emboss, the plurality of webs and the plurality of ducts in the material. It is possible for each unipolar plate strand to be coordinated with its own embossing device. Alternatively, a combined embossing device can also be provided to emboss the two unipolar plate strands.

In order to preheat the unipolar plate strands or the unipolar plates before moving to the roll gap, it may be advantageous to provide at least one induction heating device, which inductively heats one of the unipolar plates or the unipolar plate strand. Alternatively or additionally, an infrared radiator can also be provided for the preheating of the material. In this way, the subsequently introduced laser beam can have less energy in order to heat the materials to their joining temperature, so that the laser device can be smaller in design.

Furthermore, the device can comprise a heating device after the rolling device, which is adapted to relax, in particular, to anneal the material of the bipolar plate strand or the bipolar plate.

Furthermore, the device can comprise an applicator device after the rolling device, which is adapted to apply a seal on at least one of the outer surfaces of the bipolar plate strand or the bipolar plate. Here as well the already mentioned printing device can be used as above.

Furthermore, it is possible for the device to comprise a coating device after the rolling device, which is adapted to provide at least one of the outer surfaces or the bipolar plate strand or the bipolar plate with a coating. Here as well it may comprise the above mentioned printing device, which applies the coating in the roll printing method, for example.

The device can furthermore comprises a cutting device, which is designed to singulate a bipolar plate strand into individual bipolar plates or to trim a bipolar plate to a final dimension.

The features and combinations of features mentioned above in the specification and also the features and combinations of features mentioned below in the description of the figures and/or shown only in the figures can be used not only in the particular indicated combination, but also in other combinations or standing alone. Thus, embodiments not explicitly shown or discussed in the figures, yet which emerge from and can be created from the explained embodiments by separate combinations of features should be seen as also being encompassed and disclosed by the present disclosure.

BRIEF DESCRIPTION OF THE SEVERAL VIEWS OF THE DRAWINGS

Further benefits, features and details will emerge from the claims, the following description of embodiments, and the drawings.

DETAILED DESCRIPTION

Figure 1:
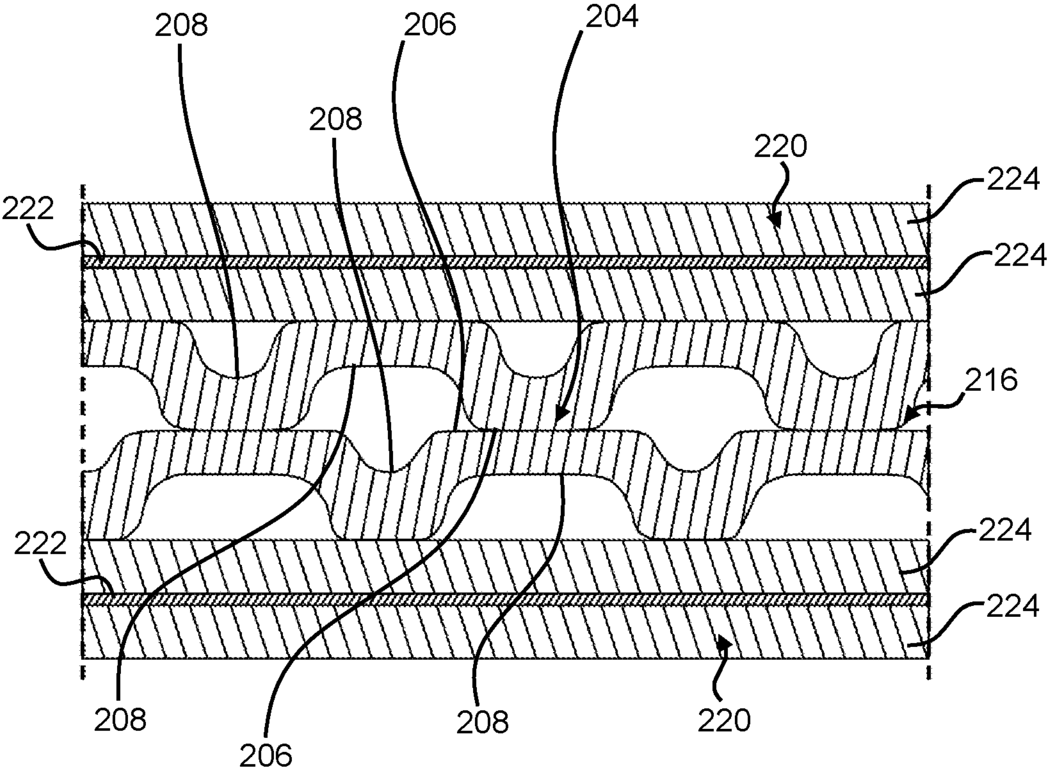
FIG. 1 shows a detailed sectional view of a cutout of a fuel cell stack with a bipolar plate formed from two unipolar plates.

FIG. 1 is a cutout view of a fuel cell stack, which is formed from multiple fuel cells 220. Each fuel cell 220 is formed with a membrane electrode assembly 222, comprising a proton-conducting membrane, associated with an electrode on either side. The membrane electrode assembly 222 is designed to carry out the electrochemical reaction of the fuel cell. A fuel (such as hydrogen) is taken to the electrode forming the anode, where it is oxidized catalytically to protons, giving off electrons. These protons are transported through the proton-conducting membrane (or ion exchange membrane) to the cathode. The electrons take out from the fuel cell flow across an electrical consumer, such as across an electric motor for driving a vehicle, or to a battery. The electrons are then taken to the cathode, or electrons are provided to it. At the cathode, the oxidation medium (such as oxygen or air containing oxygen) is reduced to anions by taking up electrons, and these react directly with the protons to form water.

With the aid of bipolar plates 216, the fuel or the cathode gas is taken to gas diffusion layers 224, which take the respective gases, diffusely distributed, to the electrodes of the membrane electrode assembly 222. The fuel, the oxidation medium, and possibly a cooling medium are taken through ducts 208 of the bipolar plate 216, which are bounded on both sides by webs 206 of the bipolar plate 216, having web backs. As can be seen from FIG. 1, each time a set of web backs lies against a gas diffusion layer 224, so that a reactant flowing in the ducts 208 can be dispensed to the gas diffusion layer 224 and thus to the electrodes of the membrane electrode assembly 222.

The bipolar plate 216 in the present case comprises two unipolar plates placed one on top of the other, being selectively joined together, especially welded, at their facing webs 206, especially their respective web backs. The facing webs 206 of the unipolar plates typically form conduits for a cooling medium with the ducts 208 situated between the webs 206.

It is furthermore evident from FIG. 1 that the webs 206 or their web backs of the unipolar plates need not necessarily have the same width, so that different widths and or depths may also be present for the ducts 208. However, for a durable connection of two unipolar plates it should be assured that at least two of the opposite webs 206 lie on top of one another, and that they can be durably connected to each other, especially by welding.

With the aid of FIG. 2, a device 100 for the production of a bipolar plate strand 214 will be explained, the bipolar plate strand 214 having a plurality of interconnected bipolar plates 216 of a fuel cell 218. This device 100 is furthermore adapted to produce a bipolar plate 216 directly even without prior production of such a bipolar plate strand 214.

The raw materials or the raw material of the bipolar plate 216 in the present case is provided on an unwinding device 140 or on multiple unwinding devices 140, comprising a first roller 128 and a second roller 130. The rollers 128, 130 provide the raw material for a first unipolar plate strand 200 and for a second unipolar plate strand 202. In order to straighten the material of the first roller 128, a first straightening device 132 is situated after the first unwinding device 140 of the first roller 128. In order to straighten the material of the second roller 130, a second straightening device 134 is situated after the second unwinding device 140 of the second roller 130. The raw material unwound from the first roller 128 and straightened with the first straightening device 132 is machined by means of a first embossing device 114 such that the first unipolar plate strand 200 is provided with a plurality of at least preformed webs 206 and a plurality of at least preformed ducts 208, running between every two adjacent webs 206. The raw material unwound from the second roller 130 and straightened with the second straightening device 134 is machined by means of a second embossing device 116 such that the second unipolar plate strand 202 is provided with a plurality of at least preformed webs 206 and a plurality of at least preformed ducts 208, running between every two adjacent webs 206.

The unipolar plate strands 200, 202 so formed are then moved in the direction of a rolling device 102, possibly with the aid of suitable deflecting mechanisms, to a roll gap 104 of a roll pair 106 provided with roll structures 112. The two unipolar plate strands 200, 202 run toward each other in an entry angle with respect to the roll gap 104. Before the two unipolar plate strands 200, 202 reach the roll gap 104, there are at first preheated if need be. The preheating of the first unipolar plate strand 200 is done by means of a first induction heating device 136 for the inductive heating of the material of the first unipolar plate strand 200. The heating of the second unipolar plate strand 202 is done by means of a second induction heating device 138 for the inductive heating of the material of the second unipolar plate strand 202.

The device 100 furthermore comprises a laser device 108, which is designed to emit a laser beam 110. The laser device 108 comprises a rotating, mirrored polygon wheel 146, by which the laser beam 110 is directed at a plurality of individual positions of a surface 210, 212 of one or both of the unipolar plate strands 200, 202 and the individual positions are thereby heated to a joining temperature immediately before or during the entry of the unipolar plate strands 200, 202 in the roll gap 104. The polygon wheel 146 can also be designed to widen the laser beam, given suitable speed of rotation, so that a ("quasistatic") laser line can be produced for the heating of the material to the joining temperature. However, the laser beam 110 with the polygon wheel 146 can also focus or be focused or be suitably shaped in or at the roll gap 104 or in direct proximity to the roll gap 104. The laser beam 110 is designed to heat locally at least one or multiple surface regions of a surface 210, 212 of the two unipolar plate strands 200, 202. The heating occurs in particular at surface regions of the facing surfaces 210, 212 when the unipolar plate strands 200, 202 enter the roll gap 104. The surfaces being heated may possess certain web backs of the webs 206 or they are formed by them. Thanks to the preheating by means of the induction heating devices 136, 138 and by means of the heat effect from the laser beam 110, the material of the unipolar plate strands 200, 202 is heated to the joining temperature. It is not absolutely necessary for the joining temperature to be present across the entire material cross section of the unipolar plate strands 200, 202, so that a graduated temperature distribution may be present in the cross section. In the continuing transport of the two unipolar plate strands 200, 202, now placed one on top of the other, a joining pressure is exerted on the at least one surface region, which has been heated to the joining temperature, by means of the roll pair 106 of the rolling device 102, such that the two unipolar plate strands 200, 202 are joined, and therefore welded, at these regions to form a common bipolar plate strand 214.

The at least one laser beam 110 or the multiple divided laser beams 110 of the laser device 108 are directed by a suitable optics onto the rotating, mirrored polygon wheel 146 before impinging on one or both of the unipolar plate strands 200, 202 or an individual unipolar plate. The mirrored polygon wheel 146 may have a base surface, formed as a regular polygon, a face surface corresponding to the base surface, and a mantle surface connecting the base surface to the face surface and formed from mirrored rectangles. The polygon wheel 146 is mounted to turn about an axis of rotation, there being an electrical drive unit adapted to drive the polygon wheel 146 in rotation about the axis of rotation, oriented perpendicular to the direction of incidence of the laser beams 110. When the laser beam 146 impinges on the mirrored rectangles of the mantle surface of the polygon wheel 146 it is reflected, and a widening of the laser beam may occur due to the rotation of the polygon wheel 146. Thus, with the aid of this polygon wheel 146, a local (limited) heating of the surface region of the unipolar plate strands 200, 202 to the joining temperature can occur, and this directly before the two rolls press the single strands together and thus join them.

Thanks to the use of the polygon wheel 146, the material is brought up to the joining temperature or even melted at one spot, and a joint line is formed from the spots by the feeding in the production line. The spots may partly overlap, so that a fluid-tight joining line is formed from the spots.

Figure 3:
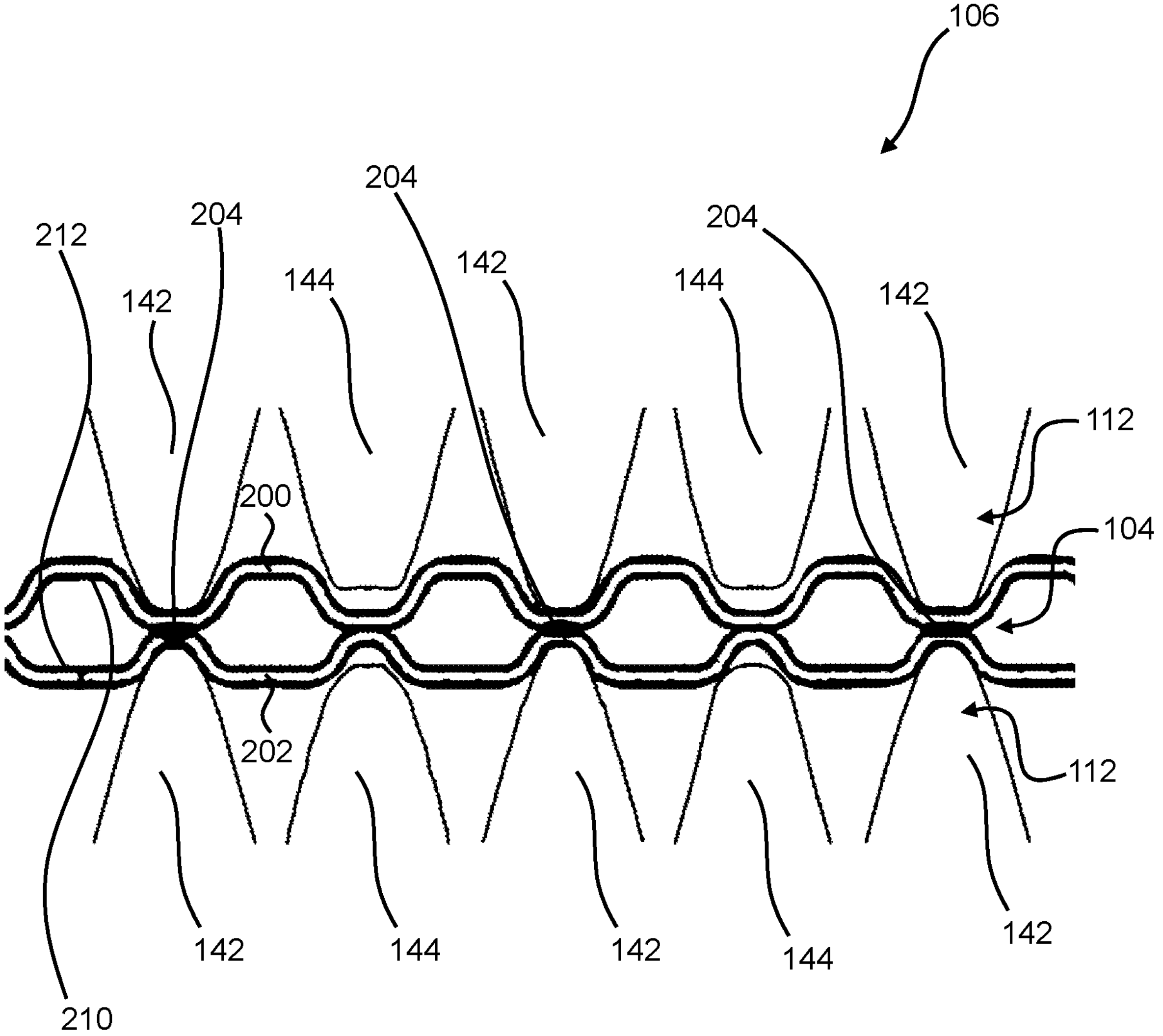
FIG. 3 shows a detailed view of the roll gap of the roll pair with unipolar plates therein or unipolar plate strands therein.

In FIG. 3 it can be seen that the roll structure 112 of the rolls of the roll pair 106 can have different roll elevations 142, 144, which either result in a joining of the two unipolar plate strands 200, 202 in a contact region 204 by virtue of the acting joining pressure or for which this is not the case. Thus, there are active roll elevations 142, between which the roll gap 104 results in a joining of the two unipolar plate strands 200, 202 located there, on the one hand, and passive roll elevations 144, between which the roll gap 104 does not result in a durable connection of the two unipolar plate strands 200, 202, on the other hand. The roll elevations 142, 144 can also be situated also only on a portion of the circumference of the particular roll. For example, the active roll elevations 142 are arranged on the circumference, radially at predefined intervals, so that for example step seams or basting seams can be created between the plate strands, with which the length of the weld seams and thus the process time can be reduced. In this regard, it is thus possible for each roll as it rolls off to create a defined number of short basting/step seams, depending on the roll structure 112. Furthermore, for the passive roll elevations 144, or also for passive rolls as a whole, it is possible for these to be configured merely as a guide for the plate strands.

Figure 2:
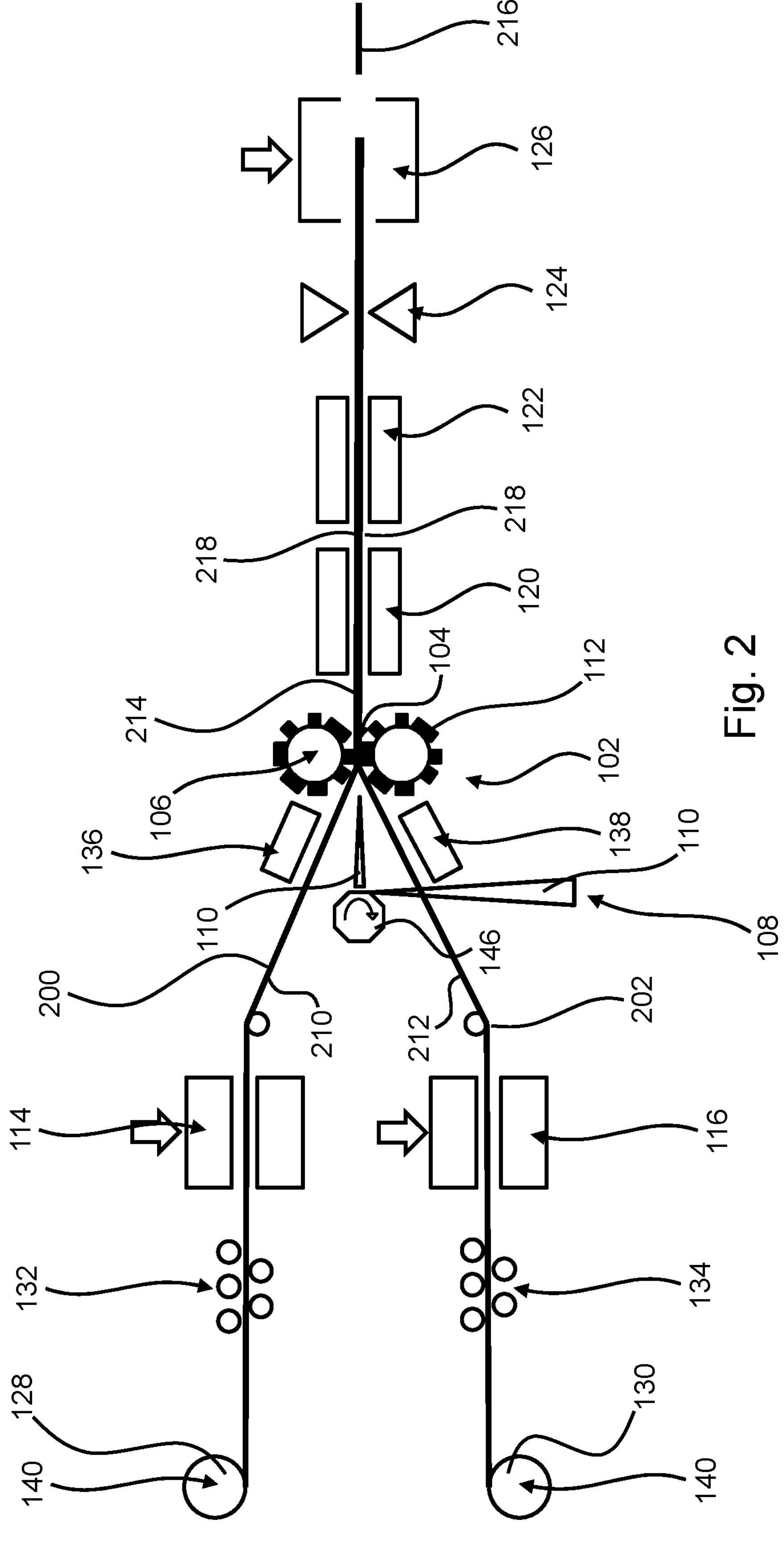
FIG. 2 shows a schematic view of a system for production of a bipolar plate strand composed of two unipolar plate strands and/or a bipolar plate composed of two unipolar plates.

As is furthermore evident from FIG. 2 of the device 100, after the rolling device 102 comes a heating device 120 for the relaxation of the resulting bipolar plate strand 204, especially for the annealing of the bipolar plate strand 214. After the heating device 120 comes an applicator device 122, which is designed to place a seal on at least one, or on both outer surfaces 218 of the bipolar plate strand 214. Furthermore, after the applicator device 122 of the device 100 comes a coating device 124, which is designed to apply a suitable coating on at least one, or both of the outer surfaces 218 of the bipolar plate strand 214. Furthermore, after the coating device 124 comes a cutting device 126, in order to singulate the bipolar plates 216 joined together in the bipolar plate strand 214 and optionally trim them to a desired final dimension; thus, individual bipolar plates 216 are produced.

Figure 4:
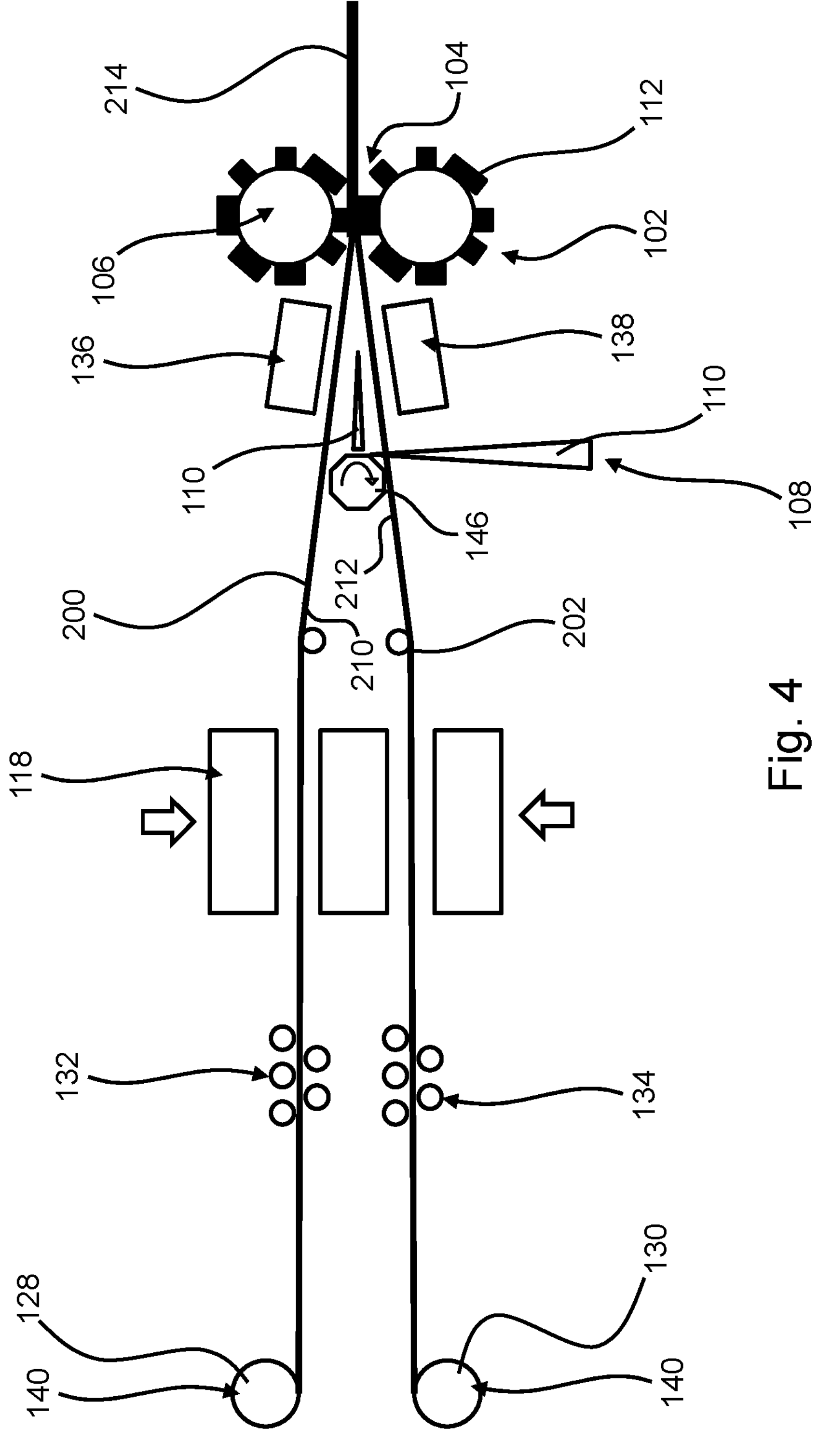
FIG. 4 shows a schematic view of a system for production of a bipolar plate strand composed of two unipolar plate strands and/or for production of a bipolar plate composed of two unipolar plates.

FIG. 4 shows a further variant of the device 100 for production of bipolar plates 216, differing from the variant of FIG. 2 merely in regard to the configuration of the embossing device. The embossing device here is formed as a combined embossing device 118, which can emboss jointly the raw material of the first unipolar plate strand 200 and the raw material of the second unipolar plate strand 202. Thus, there is no need for a more complex configuration with a first embossing device 114 and a second embossing device 116. Moreover, the entry angle of the two unipolar plate strands 200, 202 in the roll gap 104 of the rolling device 102 is reduced, resulting in greater freedom from warping of the bipolar plate strand 214 and the bipolar plates 216 singulated from it.

As a result, a device 100 and a method are indicated for the production of bipolar plates 216 or bipolar plate strands 214, providing a manufacture of bipolar plates 216 in very large lot numbers and in short cycle times. The device 100 and the indicated method are thus suitable for mass production and lower the percentage of rejects during the manufacture of bipolar plates 216 as compared to known methods and devices. The weld connections formed as described herein ensure the required tightness and the required electrical contacting of the two unipolar plates or their strands.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for producing a bipolar plate strand, comprising a plurality of interconnected bipolar plates of a fuel cell, the method comprising:

providing of a first unipolar plate strand and a second unipolar plate strand, the unipolar plate strands comprising a plurality of at least preformed webs and a plurality of at least preformed ducts running between every two adjacent webs;

moving of the unipolar plate strands in the direction of a roll gap of a roll pair provided with roll structures of a rolling device;

sending of a laser beam of a laser device onto a rotating mirrored polygon wheel, the laser beam being directed at a plurality of individual positions of a surface of one or both of the unipolar plate strands to heat the individual positions immediately before or upon entry of the unipolar plate strands in the roll gap; and joining of the unipolar plate strands at least at one of the individual positions of the surface to form a bipolar plate strand upon transporting of the unipolar plate strands through the roll gap under the action of pressure.

2. The method according to claim 1, wherein the webs and the ducts are embossed by at least one embossing device before the unipolar plate strands are provided.

3. The method according to claim 1, wherein the preformed webs and the preformed ducts are pressed into their final shape during the transport through the roll gap under the action of pressure by the roll structures.

4. The method according to claim 1, wherein the bipolar plate strand is relaxed by a heating device.

5. The method according to claim 1, wherein at least one seal is applied to at least one of the outer surfaces of the bipolar plate strand by an applicator device.

6. The method according to claim 1, wherein at least one coating is applied to at least one of the outer surfaces of the bipolar plate strand by a coating device.

7. The method according to claim 1, wherein the bipolar plate strand is divided by a cutting device into individual bipolar plates.

8. The method according to claim 1, wherein the polygon wheel is driven in rotation at a speed of at least 1000 revolutions per minute.

9. A method for producing a bipolar plate of a fuel cell, comprising:

providing of a first unipolar plate and a second unipolar plate, the unipolar plates comprising a plurality of at least preformed webs and a plurality of at least preformed ducts running between every two adjacent webs;

moving of the unipolar plates in the direction of a roll gap of a roll pair provided with roll structures of a rolling device;

sending of a laser beam of a laser device onto a rotating mirrored polygon wheel, the laser beam being directed at a plurality of individual positions of a surface of one or both of the unipolar plates to heat the individual positions immediately before or upon entry of the unipolar plates in the roll gap; and joining of the unipolar plates at least at one of the individual positions of the surface to form a bipolar plate upon transporting of the unipolar plates through the roll gap under the action of pressure.

10. A device for producing a bipolar plate of a fuel cell by a method including: providing of a first unipolar plate and a second unipolar plate, the unipolar plates comprising a plurality of at least preformed webs and a plurality of at least preformed ducts running between every two adjacent webs, moving of the unipolar plates in the direction of a roll gap of a roll pair provided with roll structures of a rolling device, sending of a laser beam of a laser device onto a rotating mirrored polygon wheel, the laser beam being directed at a plurality of individual positions of a surface of one or both of the unipolar plates to heat the individual positions immediately before or upon entry of the unipolar plates in the roll gap, and joining of the unipolar plates at least at one of the individual positions of the surface to form a bipolar plate upon transporting of the unipolar plates through the roll gap under the action of pressure, the device comprising:

a laser device, which is designed to heat by at least one laser beam at least one surface region of a surface of one or both of the two unipolar plates, there being present a rolling device having a roll pair forming a roll gap between them, wherein the rolls of the roll pair are provided with a roll structure, which is designed to press a plurality of surface regions of the two unipolar plates heated during their transport through the roll gap such that the two unipolar plates are joined to form a bipolar plate at the surface regions, wherein the laser device is associated with at least one mirrored polygon wheel driven in rotation, such that the laser beam is directed at a plurality of individual positions of the surface of one or both of the unipolar plates and the individual positions are thus heated immediately before or during the entry of the unipolar plates in the roll gap.

* * * * *